United States Patent
Aiton et al.

(10) Patent No.: US 8,127,556 B2
(45) Date of Patent: Mar. 6, 2012

(54) METHOD FOR OPERATING A TURBOMACHINE HAVING A SYNGAS FUEL SUPPLY SYSTEM AND A NON-SYNGAS FUEL SUPPLY SYSTEM

(75) Inventors: John Reuben Aiton, Simpsonville, SC (US); Joseph Robert Law, Greer, SC (US)

(73) Assignee: General Electric Company, Schenectady, NY (US)

( * ) Notice: Subject to any disclaimer, the term of this patent is extended or adjusted under 35 U.S.C. 154(b) by 738 days.

(21) Appl. No.: 12/247,610

(22) Filed: Oct. 8, 2008

(65) Prior Publication Data

US 2010/0083633 A1    Apr. 8, 2010

(51) Int. Cl.
*F02C 1/00* (2006.01)

(52) U.S. Cl. ... 60/772; 60/39.12; 60/39.463; 60/39.465; 60/781

(58) Field of Classification Search ................. 60/39.37, 60/39.463, 39.465, 772, 39.12, 39.461, 780, 60/781

See application file for complete search history.

(56) References Cited

U.S. PATENT DOCUMENTS

| | | | |
|---|---|---|---|
| 4,761,948 A * | 8/1988 | Sood et al. | 60/39.463 |
| 5,394,686 A * | 3/1995 | Child et al. | 60/39.465 |
| 5,666,800 A * | 9/1997 | Sorensen et al. | 60/39.463 |
| 6,588,212 B1 * | 7/2003 | Wallace et al. | 60/772 |
| 6,640,548 B2 * | 11/2003 | Brushwood et al. | 60/39.463 |
| 6,824,575 B1 * | 11/2004 | Otomo et al. | 60/39.12 |
| 2001/0032450 A1 * | 10/2001 | Little | 60/39.02 |
| 2006/0248872 A1 * | 11/2006 | Bachovchin et al. | 60/39.12 |
| 2009/0107105 A1 * | 4/2009 | Ziminsky et al. | 60/39.463 |
| 2009/0272118 A1 * | 11/2009 | Alexander et al. | 60/772 |
| 2011/0130941 A1 * | 6/2011 | Szepek et al. | 60/772 |

OTHER PUBLICATIONS

Arthur H. Lefebvre, Gas Turbine Combustion, 1998, Taylor & Francis, Second Edition, p. 9.*

* cited by examiner

*Primary Examiner* — William H Rodriguez
*Assistant Examiner* — Lorne Meade
(74) *Attorney, Agent, or Firm* — Dale J. Davis; Ernest G. Cusick; Frank A. Landgraff (57) ABSTRACT

The present invention provides a method of controlling a turbomachine having at least one fuel supply system that uses an unchoked valve. Here, the method may determine the flow characteristics of a fuel in a fuel supply system without using a flow meter. The present invention also provides a fuel supply system with a configuration comprising at least one unchoked valve. The fuel system may not require the use of a flow meter.

18 Claims, 5 Drawing Sheets

METHOD FOR OPERATING A TURBOMACHINE HAVING A SYNGAS FUEL SUPPLY SYSTEM AND A NON-SYNGAS FUEL SUPPLY SYSTEM

BACKGROUND OF THE INVENTION

The present application relates generally to a fuel supply system on a turbomachine; and more particularly to, a method of operating a turbomachine having a fuel supply system with at least one unchoked valve.

Some turbomachines, such as, but not limiting of, a gas turbine, an aero-derivative turbine, or the like, have multiple fuel supply systems. These fuel supply systems generally feed into at least one combustion can of a combustion system. A primary fuel supply system may use a natural gas as the fuel source; and a secondary fuel supply system may use a synthetic gas (hereinafter "syngas") as the fuel source. Each fuel supply system may operate as the sole fuel source to the combustion system. Alternatively, these fuel supply systems may simultaneously supply fuel to the turbomachine.

Turbomachines generally include a compressor, a combustion system having a plurality of combustion cans, a fuel supply system, and a turbine section. Typically, the fuel supply system delivers a fuel, such as, but not limiting of, methane to the combustion system. Some turbomachines include a Dry-Low Nox (DLN) controls system; which may require the use of a "choked" valve for providing a choked flow.

Generally, "choking flow" occurs when a fluid flows at a sonic velocity. When the sonic velocity is reached the pressure upstream of the valve should be increased in order to increase the flow downstream of the valve. The differential pressure (DP) across the valve typically creates the sonic flow.

Choked flow may provide system stability by not reacting to pressure fluctuations downstream of the valve, which may be the result of changing conditions in the turbomachine. Choked flow is typically beneficial to turbomachine operation because downstream pressure fluctuations may not create a flow disturbance in the fuel supply system.

For a few reasons, the costs associated with incorporating a choked valve into a fuel supply system are higher that an unchoked valve. A choked valve in a fuel supply system typically costs more than an unchoked valve. The pressure drop across a choked valve is higher than an unchoked valve. This generally requires that a gas compressor, or the like, perform more work to meet the necessary pressure requirement.

Non-DLN types of combustion systems generally do not require a choked valve. For example, but not limiting of, combustion systems using a syngas typically do not require choked flow. These systems may burn the syngas using a diffusion form of combustion. The pressure range upstream of an unchoked valve may be of a broader range than that of a choked valve. Here, an upstream gas compressor performs less work to maintain the pressure upstream of the unchoked valve. However, these systems may require a flow meter to control the fuel flow to the syngas fuel supply system. The flow meter adds cost and may introduce reliability concerns to the non-DLN combustion system.

For the aforementioned reasons, there is a need for a method of reducing the cost of operating a turbomachine comprising the primary and secondary combustion systems. The method should not require a flow meter to control a fuel supply system comprising at least one unchoked valve.

BRIEF DESCRIPTION OF THE INVENTION

In accordance with an embodiment of the present invention, a method of operating a turbomachine comprising a plurality of combustion cans capable of burning a syngas, wherein the turbomachine comprises at least one unchoked valve, the method comprising: providing a syngas fuel supply system wherein the non-syngas fuel supply system is integrated with the turbomachine and the syngas fuel supply system comprises an unchoked valve; providing a non-syngas fuel supply system wherein the syngas fuel supply system is integrated with the turbomachine; determining whether to operate the turbomachine under a syngas operation, wherein the syngas operation utilizes the syngas fuel supply system; and determining whether the syngas operation is a solo mode or a co-fire mode; wherein the solo mode comprises utilizing the plurality of combustions cans to burn a syngas received from the syngas fuel supply system; and wherein the co-fire mode comprises utilizing the plurality of combustions cans to burn a syngas received from the syngas fuel supply system and to burn a non-syngas received from the non-syngas fuel supply system.

In accordance with another embodiment of the present invention, a system for controlling and operating a turbomachine; the system comprising: a turbomachine comprising a plurality of combustion cans; a syngas fuel supply system integrated with the combustion system, wherein the syngas fuel supply system comprises at least one unchoked valve; a turbine control system comprising a syngas controller and a non-syngas controller; wherein the turbine control system: controls an operation of the syngas fuel supply system; operates the syngas operation under a solo mode or a co-fire mode; wherein the solo mode comprises operating the turbomachine utilizing the syngas fuel supply system; and wherein the co-fire mode comprises operating the turbomachine utilizing the syngas fuel supply system and the non-syngas fuel supply system.

BRIEF DESCRIPTION OF THE DRAWING

FIGS. 3A-3C, collectively FIG. 3, are flow charts illustrating a method of controlling a turbomachine, in accordance with an embodiment of the present invention.

DETAILED DESCRIPTION OF THE INVENTION

Certain terminology is used herein for convenience only and is not to be taken as a limitation on the invention. For example, words such as "upper," "lower", "left", "front", "right", "horizontal", "vertical", "upstream", "downstream", "fore", "aft", "top", "bottom", "upper", "bottom" merely describe the configuration shown in the Figures. Indeed, the components may be oriented in any direction and the terminology, therefore, should be understood as encompassing such variations unless specified otherwise.

An embodiment of the present invention may provide a fuel supply system with a configuration comprising at least one unchoked valve. Furthermore, this embodiment of the present invention may comprise a fuel supply system that does not include a flow meter.

An embodiment of the present invention provides a method of controlling a turbomachine having at least one fuel supply system that uses an unchoked valve. Here, the method may determine the flow characteristics of a fuel in a fuel supply system without using a flow meter.

The method of an embodiment of the present invention may simultaneous control a turbomachine having multiple fuel supply systems; which may include a primary fuel supply system and a secondary fuel supply system. The primary fuel supply system may have the form of a non-syngas fuel supply system, which may use a natural gas as the fuel source. The secondary fuel supply system may have the form of a syngas fuel supply system, which may use a syngas as the fuel source.

The method of an embodiment of the present invention may determine whether to operate the turbomachine in a single mode or in a co-fire mode. The single mode may be considered a mode where only the syngas fuel supply system supplies fuel to the combustion system of the turbomachine. The co-fire mode may be considered a mode where both the syngas fuel supply system and the non-syngas fuel supply system supply fuel to the combustion system of the turbomachine.

Figure 1:
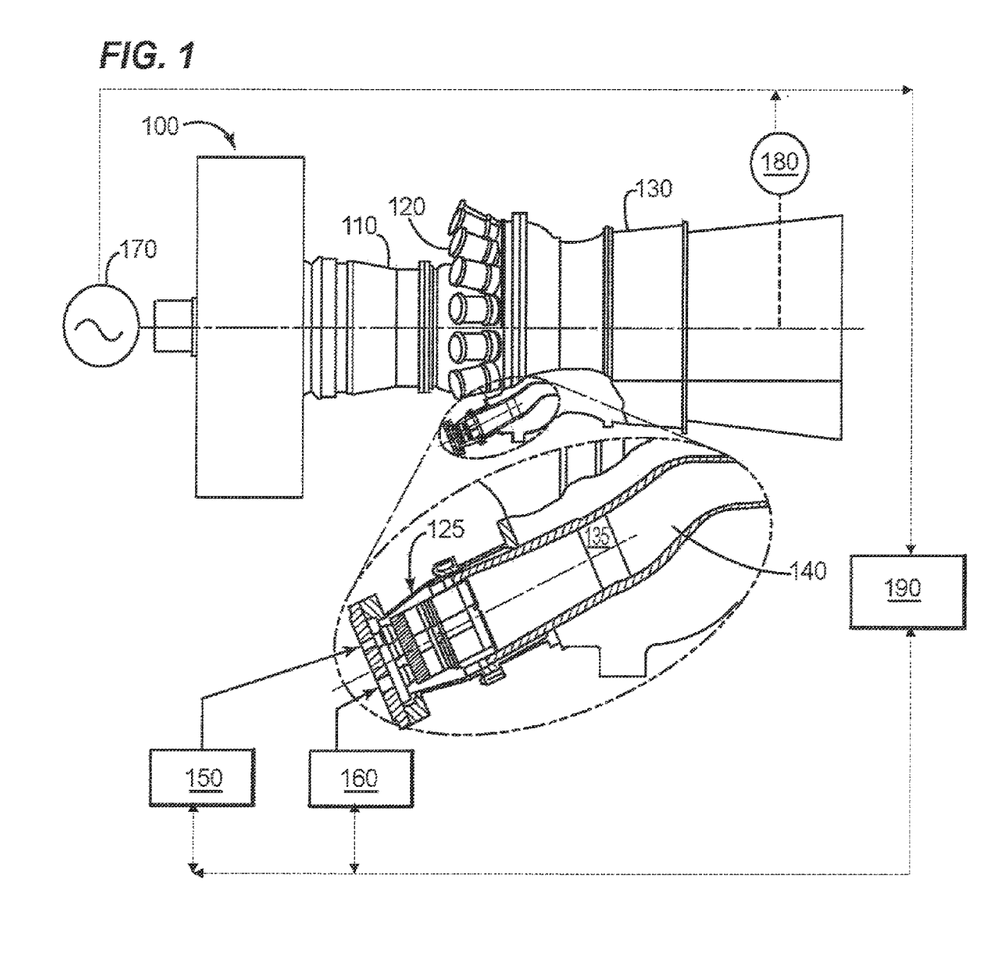
FIG. 1 is a schematic illustrating the environment in which an embodiment of the present invention operates.

Referring now to the Figures, where the various numbers represent like parts and/or elements throughout the several views, FIG. 1 is a schematic illustrating the environment in which an embodiment of the present invention operates. In FIG. 1, a turbomachine 100 includes: a compressor section 110; a plurality of combustion cans 120 of a combustion system, with each can 120 comprising a plurality of fuel nozzles 125; a turbine section 130; and a flow path 135 leading to a transition section 140. A syngas fuel supply system 150 may provide a syngas to the combustion system. A non-syngas fuel supply system 160 may provide a fuel, such as, but not limiting of, a natural gas, to the combustion system.

Generally, the compressor section 10 includes a plurality of rotating blades (not illustrated) and stationary vanes (not illustrated) structured to compress a fluid. The plurality of combustion cans 120 may be coupled to the syngas fuel supply system 150 and the non-syngas fuel supply system 160. Within each combustion can 120 the compressed air and fuel are mixed, ignited, and consumed within the flow path 135, thereby creating a working fluid.

The flow path 135 of the working fluid generally proceeds from the aft end of the plurality of fuel nozzles 125 downstream through the transition section 140 into the turbine section 130. The turbine section 130 includes a plurality of rotating and stationary components, neither of which are shown, and converts the working fluid to a mechanical torque, which may be used to generate electricity via the generator 170. The output of the generator 170 may be used by a turbine control system 190, or the like, as a parameter to control the operation of the turbomachine 100. Exhaust of the turbomachine 100 may be captured via a heat recovery steam generator (not illustrated), or the like. Exhaust temperature data 180 may be used by a turbine control system 190, or the like, as a parameter to control the operation of the turbomachine 100.

Figure 2:
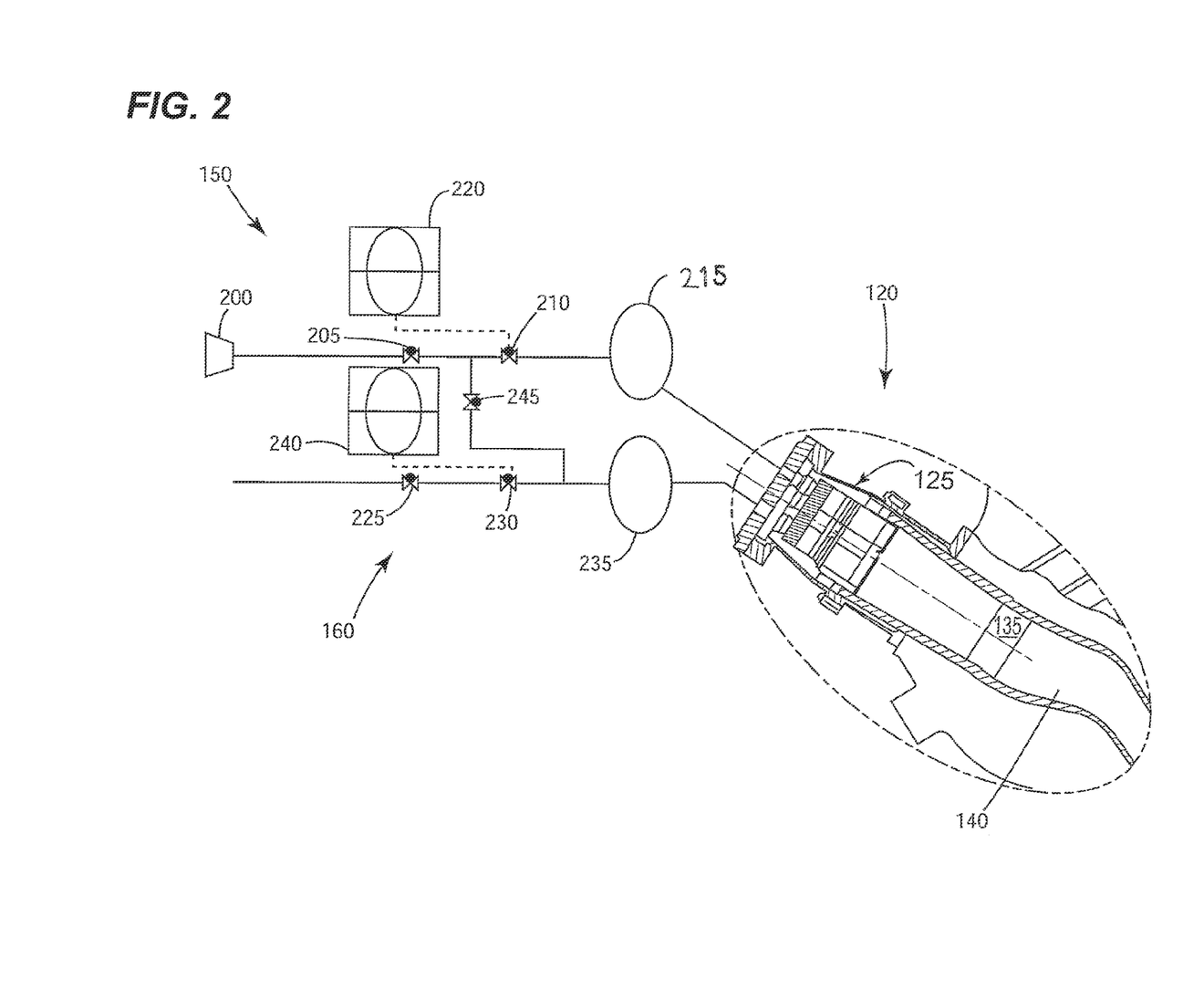
FIG. 2 is a schematic illustrating a primary and a secondary fuel supply system in accordance with an embodiment of the present invention.

FIG. 2 is a schematic illustrating a syngas and a non-syngas fuel supply systems 150, 160, in accordance with an embodiment of the present invention. An embodiment of the turbomachine 100 may comprise combustion cans 120 that may receive fuel from the syngas and the non-syngas fuel supply systems 150, 160. An embodiment of the syngas fuel supply system 150 may deliver a syngas to the combustion cans 120. An embodiment of the non-syngas fuel supply system 160 may deliver a natural gas or other non-syngas fuel to the combustion cans 120.

An embodiment of the syngas fuel supply system 150 may comprise: a syngas processing unit 200 for delivering a syngas; a first syngas valve 205, which may function as a stop valve; a second syngas valve 210, which may function as a control valve; a syngas manifold 215, which may transfer the syngas to the plurality of combustion cans 120; and a syngas controller 220, which may control the operation of the syngas fuel supply system 150. The syngas controller 220 may be integrated with the turbine control system 190. In an embodiment of the present invention, the second syngas valve 210 may have the form of an unchoked valve.

An embodiment of the non-syngas fuel supply system 160 may comprise: a first non-syngas valve 225, which may function as a stop valve; a second non-syngas valve 230, which may function as a control valve; a non-syngas manifold 235, which may transfer the fuel to the plurality of combustion cans 120; and a non-syngas controller 240, which may control the operation of the non-syngas fuel supply system 160. The non-syngas controller 240 may be integrated with the turbine control system 190.

FIG. 2 also illustrates a crossover valve 245, which may be in a line that links that syngas fuel supply system 150 with the non-syngas fuel supply system 160. The crossover valve 245 may allow syngas from the syngas fuel supply system 150 to enter the non-syngas fuel supply system 160. This may allow the non-syngas manifold 235 to achieve and/or maintain a desired range of manifold pressures, while the turbomachine 100 is operating in a co-fire mode.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like, including different versions of the aforementioned languages. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN), a wide area network (WAN), a wireless network, and combinations thereof; or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following detailed description of preferred embodiments refers to the accompanying drawings, which illustrate specific embodiments of the invention. Other embodiments having different structures and operations do not depart from the scope of the present invention.

An embodiment of the present invention takes the form of an application and process that has the technical effect of controlling the operating of a turbomachine 100 with a primary fuel supply system 150 and a secondary fuel supply system 160. The present invention may determine whether combustion cans 120 receive fuel from the primary fuel supply system 150; the secondary fuel supply system 160; or a combination of the primary and secondary fuel supply systems 150, 160.

Figure 3A:
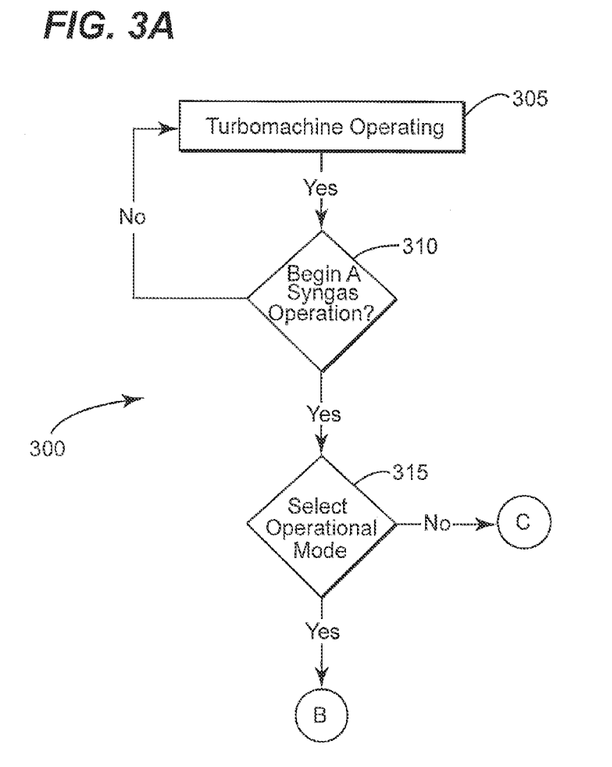
Figure 3B:
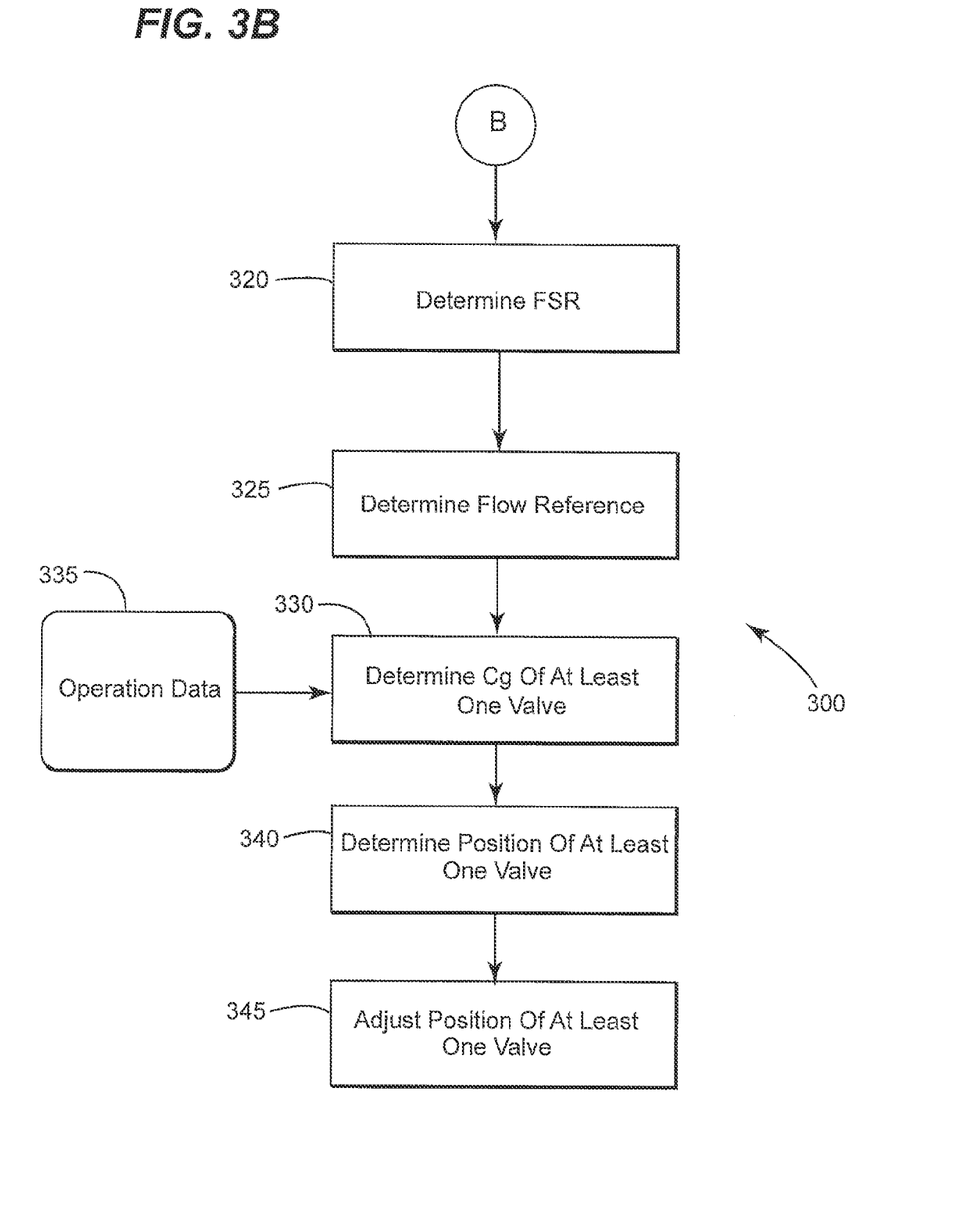
Figure 3C:
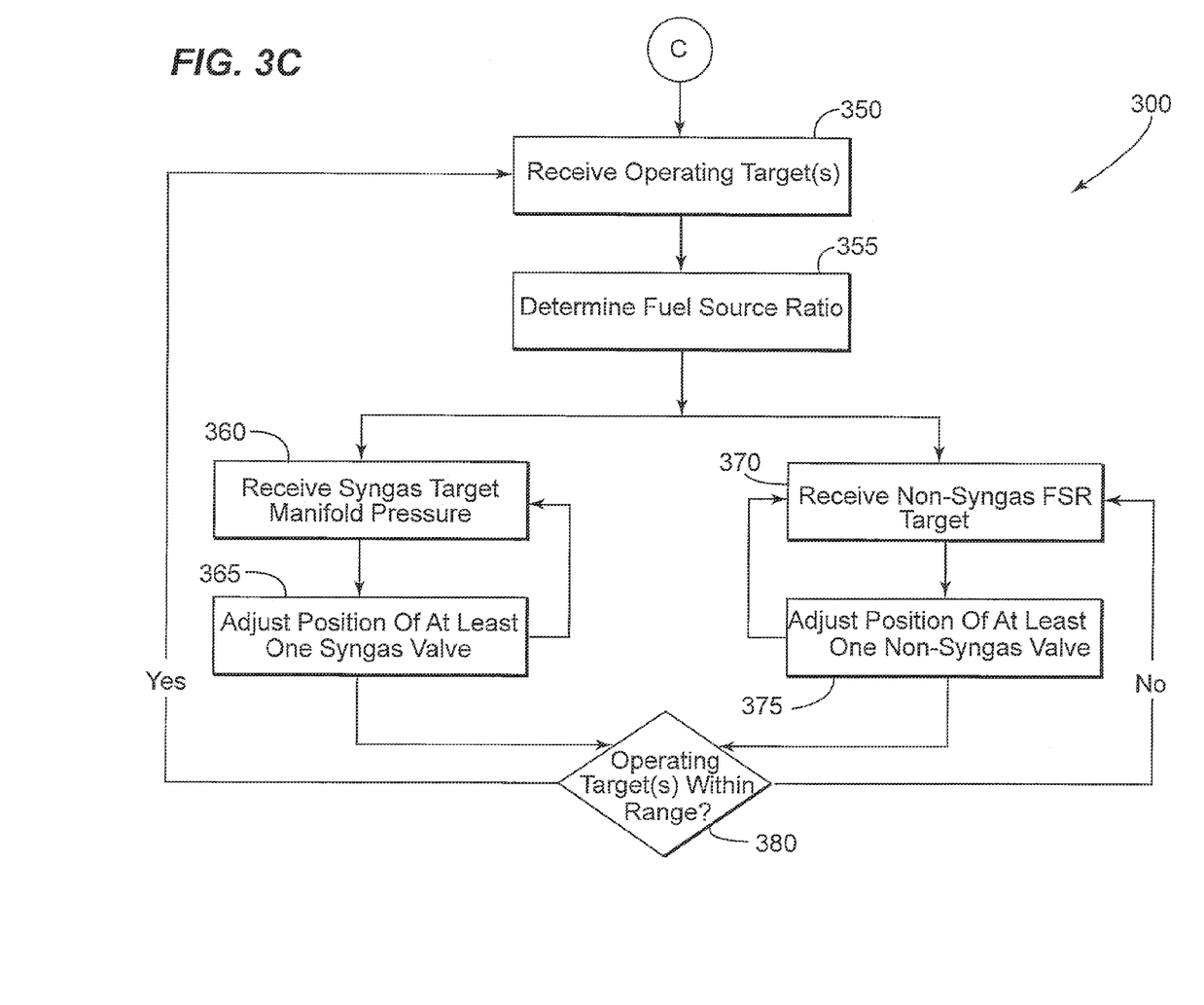

Referring now to FIGS. 3A-3C, collectively FIG. 3, which are flowcharts illustrating a method 300 of operating a turbomachine 100, in accordance with an embodiment of the present invention. The method 300 may include at least one turbine control system, which may function, for example, but not limiting of, in steps 305 to 380. In an embodiment of the present invention the method 300 may be integrated with a graphical user interface (GUI), or the like. The GUI may allow the operator to navigate through the method 300 described below. The GUI may also provide at least one notification of the status of the method 300.

In step 305, the turbomachine 100 may be operating in a mode allowing for a syngas operation. For example, but not limiting of, the turbomachine 100 may be operating solely on the non-syngas fuel supply system 160. Here, the combustion system of the turbomachine 100 may be burning a natural gas, while operating at spinning reserve.

In step 310, the method 300 may determine whether to begin a syngas operation. Here, the GUI may provide a notification to an operator asking whether a syngas operation should commence. In an embodiment of the present invention the method 300 may determine whether an operational permissive(s) required for syngas operation is satisfied before providing the notification to the operation. If a syngas operation is to start, then the method 300 may proceed to step 315; otherwise the method 300 may revert to step 305.

In step 315, the method 300 may determine an operational mode of the syngas fuel supply system. The method 300, of an embodiment of the present invention, may control multiple fuel supply systems. For example, but not limiting of, the operator may select from operating the turbomachine 100 in a syngas only mode. Here, the syngas fuel supply system 150 may provide the sole fuel entering the plurality of combustion cans 120. Alternatively, the operator may select a co-fire mode where the syngas fuel supply system 150 and the non-syngas fuel supply system 160 may supply the fuel to the plurality of combustion cans 120. If a syngas only mode is selected, then the method 300 may proceed to step 320, illustrated in FIG. 3B; otherwise the method 300 may proceed to step 350, illustrated in FIG. 3C.

As discussed, an embodiment of the present invention may provide a syngas fuel supply system 150 having at least one unchoked valve. In an embodiment of the present invention, the second syngas gas valve 210 may be an unchoked control valve. The method 300 may not require a flow meter to determine the flow through an unchoked valve. This feature may benefit an operator of the turbomachine 100 by reducing the overall cost and maintenance, while improving plant efficiency and reliability of the syngas fuel supply system 150.

FIG. 3B illustrates steps 320-345, which may control the turbomachine 100 under a syngas only mode. Referring now to step 320, where the method 300 may control determine a Fuel Stroke Reference (FSR) of a syngas only operation. The FSR may be considered the "called-for-fuel". FSR may represent the amount of fuel required to be combusted to satisfy a desired turbomachine output; such as, but not limiting of, a generator output, an exhaust temperature setpoint, or the like. For example, but not limiting of, the FSR value may derive from an FSR selection algorithm (not illustrated). This algorithm may select a FSR value from a plurality of FRS values. Here, FSR_A may correspond to a called-for-fuel value for a generator output, and FSR_B may correspond to a called-for-fuel value for a specific exhaust temperature setpoint.

In step 325, the method 300 may determine a flow reference for at least one unchoked control valve. An embodiment of the method 300 may modify the FSR value from step 320 to determine the flow reference. For example, but not limiting of, the method 300 may use a scaling method to scale the FSR value to create the flow reference.

In step 330, the method 300 may determine a range for a required Critical Flow Capacity (Cg) value of the at least one unchoked valve. In an embodiment of the present invention, the method 300 may incorporate an algorithm to determine a range for a required Cg of the unchoked valve. The algorithm may receive operation data, illustrated in step 335, to calculate the Cg value. The operation data may include, for example, but not limiting of, a molecular weight of the syngas used in the syngas fuel supply system 150; the pressure and the temperature of the syngas upstream of the unchoked valve; and a differential pressure of an unchoked valve, such as, but not limiting of, the syngas valve 210.

The algorithm may also determine a nozzle pressure ratio (NPR) of the syngas manifold 215. The NPR may assist with maintaining acceptable combustion dynamics within the combustion cans 120. In an embodiment of the present invention, the algorithm may include a maximum NPR value and a minimum NPR value. Here, the GUI of the method 300 notify the operator if the NPR determined by the algorithms is outside of the range between the minimum and maximum NPR values. In an embodiment of the present invention, the minimum and maximum NPR values may set by the operator. In an embodiment of the present invention, default values the minimum and maximum NPR values may be preconfigured within the algorithm.

In step 340, the method 300 may determine a required position of the at least one unchoked valve. For example, but not limiting of, the method 300 may determine the required position of the second syngas valve 210 in order to satisfy the FSR target. Alternatively, the method 300 may determine the required position of a plurality of valves in order to satisfy the FSR target.

In step 345, the method 300 may adjust the position of at least one unchoked valve, such as, but not limiting of, the second syngas valve 210. Here, the method 300 may stroke each valve to the position determined in step 340. In an embodiment of the present invention, the method 300 may continually determine the FSR value based on the received operating parameters, repeating steps 320-345.

FIG. 3C illustrates steps 350-380, which may control the turbomachine 100 under a co-fire mode, where a syngas and a non-syngas may be simultaneously burned within the plurality of combustion cans 120. In an embodiment of the present invention, the method 300 may include an operational order, which prioritizes syngas operation over non-syngas operation. Here, the priority of the turbomachine operation may be as follows: 1) ensure that the syngas generated by syngas processing unit 200 is consumed by the turbomachine 100; 2) ensure that the NPRs of the syngas fuel supply system 150, and the non-syngas fuel supply system 160 are maintained within desired limits; and 4) the desired turbomachine 100 operating output is satisfied.

In step 350, the method 300 may receive at least one operating target. An operating target may be considered a desired output from the turbomachine 100. For example, but not limiting of, an operating target may include: an output of the generator, an exhaust temperature setpoint, or the like. In an alternate embodiment of the present invention, the operating target may be the selection of maintaining a syngas fuel supply system pressure and/or achieving an operating output exceeding the capacity of the syngas fuel supply system in order to achieve maximum syngas consumption.

In step 355, the method 300 may determine a fuel source ratio; which may be considered the split among the total fuel consumed by the turbomachine 100, between the syngas and the non-syngas. For example, but not limiting of, a fuel source ratio of 90/10 may represent that the total fuel consumed by the turbomachine is 90% syngas and 10% non-syngas. As illustrated in FIG. 3C, the method 300 may simultaneously control the syngas operation in steps 360 and 365; and the non-syngas operation in steps 370 and 375.

In step 360, the method 300 may receive a target manifold pressure for the syngas fuel supply system 150. The target manifold pressure may be determined, in part, by the output of the syngas processing unit 200. As discussed, the method 300 may prioritize the consumption of the generated syngas by the turbomachine 100. The method 300 may comprises an algorithm that receives data from the output of the syngas processing unit 200. The algorithm may then determine an appropriate range of the pressure of the syngas gas manifold 215.

In step 365, the method 300 may determine a required position of at least one valve in the syngas fuel supply system 150 that may maintain the manifold pressure determined in step 360. For example, but not limiting of, the method 300 may determine the position of the syngas control valve 210 that may allow sufficient flow for maintaining a desired pressure of the syngas manifold 215. The position of valve 210 may be continuously adjusted until a pressure target for the syngas fuel supply system 150 is satisfied.

In step 370, the method 300 may receive a target FSR for the non-syngas fuel supply system 160. The target FSR may be considered the FSR value required to meet the desired operational targets. For example, but not limiting of, if the operational target is a generator output of 100 megawatts. The syngas fuel supply system 150 may generate 75 megawatts. Here, the target FSR value for the non-syngas fuel supply system 160 may be a value that can generate 25 megawatts allowing the turbomachine to meet the operational target of 100 megawatts.

In step 375, the method 300 may determine a required position of at least one valve in the non-syngas fuel supply system 160 that may meet the FSR target generated in step 370. For example, but not limiting of, the method 300 may determine the position of the non-syngas control valve 230 that may allow sufficient flow to meet the aforementioned operational target(s). Here, the method 300 may continuously adjust the valve 215 until the target is achieved and/or maintained.

In step 380, the method 300 may determine whether the operational target(s) is within a desired range. For example, but not limiting of, the method 300 may be compared a target generator output with the actual generator output. Here, the method 300 may continuously executes steps 350-380 to achieve and/or maintain a target output. Furthermore, if the operational target changes, the FSR value may also change. Here, if the desired generator output is increased to 125 megawatts from 100 megawatts, then the target FSR value for the non-syngas fuel supply system 160 may be increased to a value that can generate 50 megawatts allowing the turbomachine to meet the operational target of 125 megawatts.

In an embodiment of the present invention, the method 300 may attempt to ensure that the nozzle pressure ratio (NPR) of the non-syngas fuel supply system 160 is within a range, as previously described. If the NPR is outside of the range, then the method 300 may adjust the stroke of the crossover valve 245 provided that the operational targets may be maintained.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A method of operating a turbomachine comprising a plurality of combustion cans capable of burning a syngas, the method comprising:
    providing a syngas fuel supply system wherein the syngas fuel supply system is integrated with the turbomachine and the syngas fuel supply system comprises a syngas valve;
    providing a non-syngas fuel supply system wherein the non-syngas fuel supply system is integrated with the turbomachine;
    determining whether to operate the turbomachine under a syngas operation, wherein the syngas operation utilizes the syngas fuel supply system; and
    determining whether the syngas operation is a solo mode or a co-fire mode; wherein the solo mode comprises utilizing the plurality of combustion cans to burn the syngas received from the syngas fuel supply system; and the solo mode performs the steps of:
    determining a fuel stroke reference (FSR);
    utilizing the FSR to determine a flow reference;
    utilizing the flow reference to determine a critical flow capacity (Cg) of the syngas valve;
    utilizing the Cg to determine a required position of the syngas valve; and
    adjusting the syngas valve to the required position; and wherein the co-fire mode comprises utilizing the plurality of combustion cans to burn the syngas received from the syngas fuel supply system and to burn a non-syngas received from the non-syngas fuel supply system.

2. The method of claim 1, wherein the step of utilizing the flow reference to determine a Cg of the syngas valve comprises receiving a plurality of operating data.

3. The method of claim 2, wherein the plurality of operating data comprises at least one of the following:
    a molecular weight of the syngas used in the syngas fuel supply system;
    a pressure of the syngas upstream of the syngas valve;
    a temperature of the syngas upstream of the syngas valve; and
    a differential pressure of the syngas valve.

4. The method of claim 3, wherein the solo mode provides at least one notification on a status of the turbomachine operation.

5. The method of claim 1, wherein operating the co-fire mode performs the steps of:
    receiving at least one turbomachine operational target;
    determine a fuel source ratio, wherein the fuel source ratio comprises a split between the syngas and the non-syngas consumed by the turbomachine to meet the at least one turbomachine operational target;
    receiving a target pressure value for a syngas manifold that provides the syngas consumed by the turbomachine; and
    adjusting a position of the syngas valve to meet the target pressure of the syngas manifold.

6. The method of claim 5, wherein operating the co-fire mode further performs the steps of:
    receiving a non-syngas FSR target; and
    adjusting a stroke of a non-syngas valve to meet the non-syngas FSR target.

7. The method of claim 6, wherein operating the co-fire mode further performs the step of determining whether the at least one turbomachine operational target is satisfied.

8. The method of claim 7, wherein operating the co-fire mode provides at least one notification on a status of the turbomachine operation.

9. The method of claim 1 further comprising controlling the syngas fuel supply system and the non-syngas fuel supply system with a turbine control system.

10. A method for controlling and operating a turbomachine comprising:
    operating a turbomachine comprising a plurality of combustion cans;
    operating a syngas fuel supply system integrated with the turbomachine, wherein the syngas fuel supply system comprises at least one syngas valve;
    operating a turbine control system comprising a syngas controller and a non-syngas controller; wherein the turbine control system: controls an operation of the syngas fuel supply system; operates the syngas operation under a solo mode or a co-fire mode; and the solo mode performs the steps of:
    determining a fuel stroke reference (FSR);
    utilizing the FSR to determine a flow reference;
    utilizing the flow reference to determine a critical flow capacity (Cg) of the syngas valve;
    utilizing the Cg to determine a position of the at least one syngas valve;
    and adjusting the at least one syngas valve to the position utilizing the Cg to determine a required position of the syngas valve; and
    adjusting the syngas valve to the required position; and wherein the solo mode comprises operating the turbomachine utilizing the syngas fuel supply system; and wherein the co-fire mode comprises operating the turbomachine utilizing the syngas fuel supply system and a non-syngas fuel supply system.

11. The method of claim 10, wherein the turbine control system receives a plurality of operating data.

12. The method of claim 11, wherein the plurality of operating data comprises at least one of the following:
    a molecular weight of a syngas used in the syngas fuel supply system;

a pressure of the syngas upstream of the at least one syngas valve;

a temperature of the syngas upstream of the at least one syngas valve; and a differential pressure of the at least one syngas valve.

13. The method of claim 12, wherein the turbine control system provides at least one notification on a status of the turbomachine.

14. The method of claim 13, wherein the turbine control system operating the turbomachine in the co-fire mode:

receives at least one turbomachine operational target;

determines a fuel source ratio, wherein the fuel source ratio comprises a split between the syngas and a non-syngas consumed by the turbomachine to meet the at least one turbomachine operational target;

receives a target pressure of a syngas manifold; and adjusts a position of the syngas valve to meet the target pressure of the syngas manifold pressure.

15. The method of claim 14, wherein the turbine control system:

receives a non-syngas FSR target; and adjusts a position of at least one non-syngas valve to meet the non-syngas FSR target.

16. The method of claim 15, wherein the turbine control system determines whether the at least one turbomachine operational target is satisfied.

17. A method of operating a turbomachine comprising a plurality of combustion cans capable of burning a syngas, the method comprising:

providing a syngas fuel supply system wherein the syngas fuel supply system is integrated with the turbomachine and the syngas fuel supply system comprises a syngas valve;

providing a non-syngas fuel supply system wherein the non-syngas fuel supply system is integrated with the turbomachine;

determining whether to operate the turbomachine under a syngas operation, wherein the syngas operation utilizes the syngas fuel supply system; and determining whether the syngas operation is a solo mode or a co-fire mode; wherein the solo mode comprises utilizing the plurality of combustion cans to burn the syngas received from the syngas fuel supply system; and the solo mode performs the steps of:

determining a fuel stroke reference (FSR);

utilizing the FSR to determine a flow reference;

utilizing the flow reference to determine a critical flow capacity (Cg) of the syngas valve; comprising receiving a plurality of operating data; wherein the plurality of operating data comprises at least one of the following: a molecular weight of the syngas used in the syngas fuel supply system; a pressure of the syngas upstream of the syngas valve; a temperature of the syngas upstream of the syngas valve; and a differential pressure of the syngas valve;

utilizing the Cg to determine a required position of the syngas valve;

adjusting the syngas valve to the required position; and providing at least one notification on a status of the turbomachine operation; and wherein the co-fire mode comprises utilizing the plurality of combustion cans to burn the syngas received from the syngas fuel supply system and to burn a non-syngas received from the non-syngas fuel supply system.

18. A method for controlling and operating a turbomachine comprising:

operating a turbomachine comprising a plurality of combustion cans;

operating a syngas fuel supply system integrated with the turbomachine, wherein the syngas fuel supply system comprises at least one syngas valve;

operating a turbine control system comprising a syngas controller and a non-syngas controller; wherein the turbine control system:

controls an operation of the syngas fuel supply system;

operates the syngas operation under a solo mode or a co-fire mode; and the solo mode performs the steps of:

determining a fuel stroke reference (FSR);

utilizing the FSR to determine a flow reference;

utilizing the flow reference to determine a critical flow capacity (Cg) of the syngas valve; comprising receiving a plurality of operating data; wherein the plurality of operating data comprises at least one of the following: a molecular weight of the syngas used in the syngas fuel supply system; a pressure of the syngas upstream of the syngas valve; a temperature of the syngas upstream of the syngas valve; and a differential pressure of the syngas valve;

utilizing the Cg to determine a required position of the syngas valve; and adjusting the at least one syngas valve to the required position; and wherein the solo mode comprises operating the turbomachine utilizing the syngas fuel supply system; and wherein the co-fire mode comprises operating the turbomachine utilizing the syngas fuel supply system and a non-syngas fuel supply system.

* * * * *